United States Patent [19]

Gruenewald

[11] 4,177,961
[45] Dec. 11, 1979

[54] EXTENSION CORD HOLDER

[75] Inventor: Manfred Gruenewald, Woodside, N.Y.

[73] Assignee: Excel Plastic Products, Inc., Jersey City, N.J.

[21] Appl. No.: 918,642

[22] Filed: Jun. 23, 1978

[51] Int. Cl.² ............................................. B65H 75/36
[52] U.S. Cl. ................................................... 242/85.1
[58] Field of Search ..................... 242/85.1, 96, 125.2; 191/12.2 R; 16/110 R, 119, 125; 215/100 A; 220/94 R, 94 A, 95; 248/222.4

[56] References Cited

U.S. PATENT DOCUMENTS

| 1,058,925 | 4/1913 | Toegel | 242/85.1 |
| 2,222,802 | 11/1940 | Ragsdale | 242/85.1 |
| 2,772,056 | 11/1956 | Hoepter | 242/85.1 |
| 3,622,100 | 11/1971 | Wright | 242/85.1 |
| 4,123,012 | 10/1978 | Hough | 242/85.1 |

Primary Examiner—Edward J. McCarthy
Attorney, Agent, or Firm—Daniel H. Bobis

[57] ABSTRACT

An Extension Cord Holder having side members connected by a center section which is shorter than the side members so as to provide a cord receiving space therebetween at opposite ends of the center section, the center section preferably has curved ends to facilitate the winding of the extension cord about the center section, and a handle is connected to one side member for carrying the Extension Cord Holder. The handle is involuted on at least one end adjacent to the side member to which the handle is connected to form a locking recess for receiving one end of the extension cord and the handle has a section thereon which defines an opening in communication with the locking recess narrower in width than the locking recess but which can be sprung slightly, if the handle has the required degree of resiliency, by the pressure of the end of the extension cord being forced into the locking recess.

8 Claims, 9 Drawing Figures

EXTENSION CORD HOLDER

BACKGROUND OF THE INVENTION

This invention relates generally to brackets or holders for cords, cables, ropes and the like and more particularly to an Extension Cord Holder which is preferably portable in nature.

At least one device has been developed for winding an extension cord thereon and for carrying the same which consists generally of spaced side members and reinforced spaced transverse members. The spaced transverse members define with the spaced side members a cord receiving space at opposite ends of the device for holding the extension cord. This prior art Extension Cord Holder has a reinforced handle on one side member, cord end brackets spaced from the handle, and supporting openings for hanging the Extension Cord Holder when the same is not in use.

An Extension Cord Holder of the type above described is shown in U.S. Pat. No. 4,123,012.

The present invention provides an improved Extension Cord Holder wherein the side members are connected by a center section which is shorter than the side member to provide the cord receiving spaces at opposite ends thereof and wherein the handle defines at least one locking recess for securing the end of the extension cord therein.

SUMMARY OF THE INVENTION

Thus the present invention covers and Extension Cord Holder having spaced side members, a center section connecting said side members to each other and having a length shorter than the side members to form spaced cord receiving recesses between the side members at opposite ends thereof, a handle connected to at least one of said members, and said handle defining at least one locking recess.

The present invention covers an Extension Cord Holder as above described wherein the handle has elasticity to facilitate springing of the opening to the locking recess to permit the end of the extension cord to be forced into position so as to be held securely in the locking recess.

Accordingly, it is an object of the present invention to provide a low cost portable Extension Cord Holder.

It is another object of the present invention to provide a low cost unitary Extension Cord Holder made of a plastic material.

It is another object of the present invention to provide an Extension Cord Holder which has means thereon for hanging the same on a bracket when it is not in use.

Other objects and advantages of the invention will be apparent from the following description of a preferred embodiment thereof as illustrated in the attached drawings.

Figure 1:
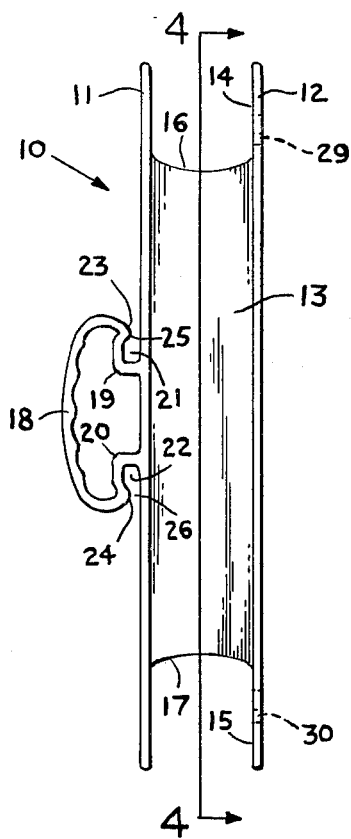
FIG. 1 is a front view of an Extension Cord Holder in accordance with the present invention.

Referring to the drawings FIGS. 1 to 4 show an Extension Cord Holder generally designated 10 in accordance with the present invention. The Extension Cord Holder 10 may be made of any suitable type of material but preferably is molded as a unitary device from plastic materials such as Styrene; Polypropylene, acrylnitryl, Butadiene, Styrene (ABS) and like plastics. The Extension Cord Holder 10 has spaced elongated side members as at 11 and 12 which are connected by a center section 13. The center section 13 is preferably solid to provide strength to the assembled elements of the Extension Cord Holder and at the same time this will also permit the center section to be made relatively thin so as to reduce the amount of plastic or other material required in the formation of this device.

Center section 13 if solid can also provide means for placing instructions or other information thereon in connection with the manufacture, use, and sale of the Extension Cord Holder.

Figure 5:
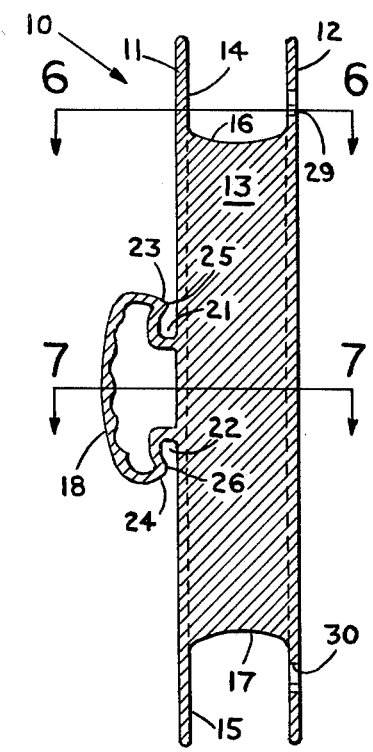
FIG. 5 is a longitudinal cross-section taken on Line 5—5 of FIG. 2.
Figure 6:
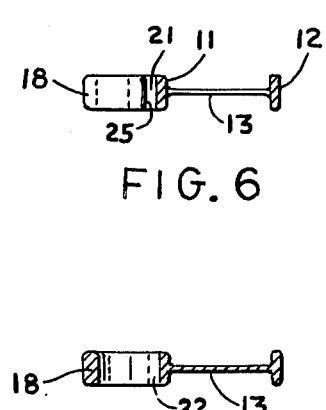
FIG. 6 is a cross-section taken on Line 6—6 of FIG. 5.
Figure 7:
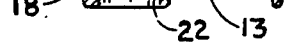
FIG. 7 is a cross-section taken on Line 7—7 of FIG. 5.
Figure 8:
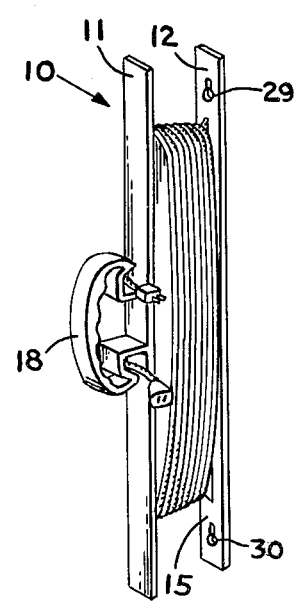
FIG. 8 is a perspective view of the Extension Cord Holder in accordance with the invention as shown in FIG. 1.

Referring further to FIGS. 1 and 5 the center section 13 is shown to be shorter in length than the side members 11 and 12 so that cord receiving spaces or recesses are formed as at 14 and 15 on opposite ends of the Extension Cord Holder. Further to facilitate the uniform winding of the extension cord in the cord receiving recesses 14 and 15 the opposite ends as at 16 and 17 of the center section are curved.

In order to permit the Extension Cord Holder to be easily carried, a handle 18 is connected to the side member 11 as is shown in FIGS. 1, 2, 5, 6, 7, and 8.

Handle 18 has involuted portions as at 19 and 20 adjacent the point where the handle is connected to the side member 11 which convoluted sections define respectively with the side member 11 a first or locking recess 21 and a second cord locking recess 22 as is shown in FIGS. 1, 5, 6 and 7 of the drawings. Further the involuted sections are continuous with curved sections as at 23 and 24 on the handle which form with the side member 11 spaced openings as at 25 and 26 in communication with the respective locking recesses 21 and 22.

If the handle is made sufficiently resilient when the end of the cord is forced against the curved sections 23 and 24 it will cause the curved sections to move outwardly thus springing the handle and expanding the respective openings 25 and 26 so that the cord can be moved into the cord or locking recesses 21 and 22 as may be required.

The size of the locking recess and the size of the opening formed by the handle will be a function of the diameter of the extension cords which are wound on the extension cord holder. As a general range extension cord holders in accordance with the present invention will be sized so that the locking recesses and the resiliency of the handle will permit the openings in communication with the respective locking recesses to receive extension cords in a classified range from 16/1 to 16 guage. However, it will be understood by those skilled in the art that the size of the locking recess and the opening can be varied as the diameter of the extension cord to be wound therein may vary.

Figure 9:
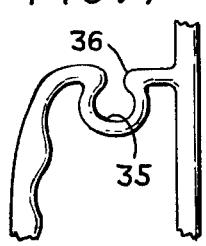
FIG. 9 is a fragmentary view of the handle section of a modified form of Extension Cord Holder.

Additionally, those skilled in the art will readily recognize that the locking recess can be formed solely by an involuted section on the handle as is shown at 35 in FIG. 9. The resiliency of the handle will permit the opening 36 to be sprung slightly when the extension cord end is forced into the locking recess 35.

Figures 2, 3, 4:
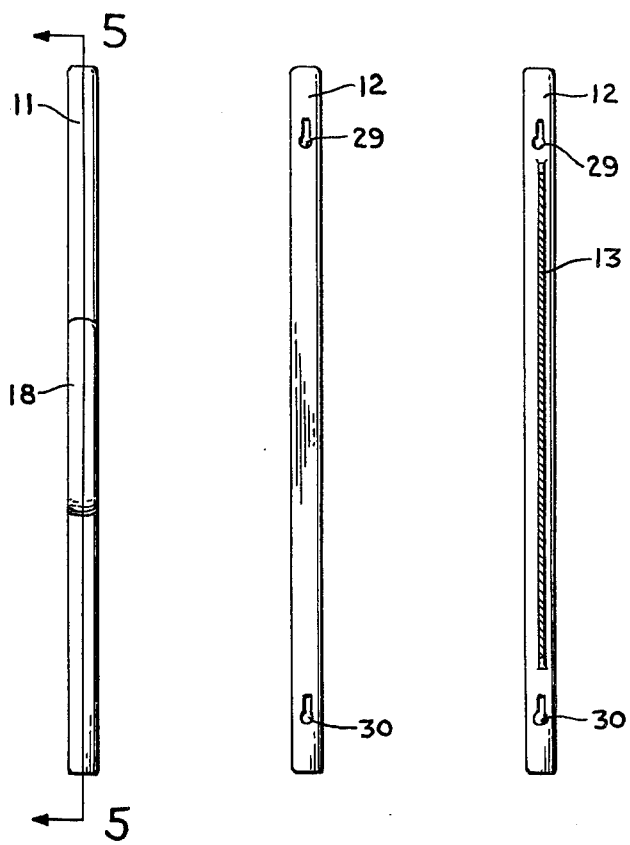
FIG. 2 is a right side view of the Extension Cord Holder shown in FIG. 1.
FIG. 3 is a left side view of the Extension Cord Holder shown in FIG. 1.
FIG. 4 is a longitudinal cross-section taken on Line 4—4 of FIG. 1.

FIG. 3 shows that the side member 12 is provided with key ways as at 29 and 30 inwardly of the respective opposite ends thereof which key ways extend through the side member and permit the Extension Cord Holder to be mounted on nails or the like type of brackets when the Extension Cord Holder is not in use.

Thus there has been described an improved Extension Cord Holder which is simple in construction, compact and relatively strong for the required uses thereof.

It will be understood that the invention is not to be limited to the specific construction or arrangement of parts shown but that they may be widely modified within the invention defined by the claims.

WHAT IS CLAIMED IS:

1. An integrally molded Extension Cord Holder comprising;
   a. spaced side members,
   b. a substantially unitary elongated center section connecting said side members to each other having a length shorter than the side members to form spaced cord receiving recesses between the side members respectively at opposite ends of the Extension Cord Holder,
   c. a handle connected to one of said side members, and
   d. at least one locking recess formed by said handle.

2. An Extension Cord Holder as claimed in claim 1 wherein,
   a. means on said handle defines an opening in communication with said at least one locking recess, and
   b. said handle has sufficient resiliency to permit said means to be sprung slightly wider for facilitating access through said opening to the locking recess.

3. In an Extension Cord Holder as claimed in claim 1;
   a. said handle defines said first locking recess at one end thereof adjacent the one of said side members to which said handle is connected, and also defines a second locking recess at the opposite end of said handle spaced from said first locking recess and also adjacent the said one side member of said spaced side members to which the handle is connected.

4. In an Extension Cord Holder as claimed in claim 1 wherein;
   a. said handle is involuted at least at one end adjacent the one of said side members to which the handle is connected to form a locking recess, and
   b. means on said handle defining an opening between the handle and said one side member in communication with the locking recess.

5. In an Extension Holder as claimed in claim 4 wherein said handle is resilient to permit the said opening to be forced to a greater width to permit access to the locking recess.

6. In an Extension Cord Holder as claimed in claim 1 wherein;
   a. said handle has the locking recess formed by an involuted end of the handle at a point spaced from the point of connection to said one of said spaced side members,
   b. said handle having a medially section in said involuted end defining an opening in communication with the locking recess and having a width less than the width of said locking recess, and
   c. said handle being sufficiently resilient to permit said medial section to be sprung slightly wider for facilitating access through the opening to the locking recess.

7. In an Extension Cord Holder as claimed in claim 1 wherein slot means is formed on another one of said spaced side members for hanging the Extension Cord Holder when the same is not in use.

8. An Extension Cord Holder as claimed in claim 3 wherein,
   a. means on the ends of the handle defining respectively in each end spaced openings and one of said spaced openings in communication with the first locking recess and the other of said spaced openings in communication with the second locking recess,
   b. said handle has sufficient resiliency to permit said end means to be sprung slightly wider for facilitating access through said respective spaced openings to the respective first locking recess and second locking recess.

* * * * *